Nov. 22, 1938.   A. C. ELDER   2,137,893
POWER SAW
Filed March 2, 1936
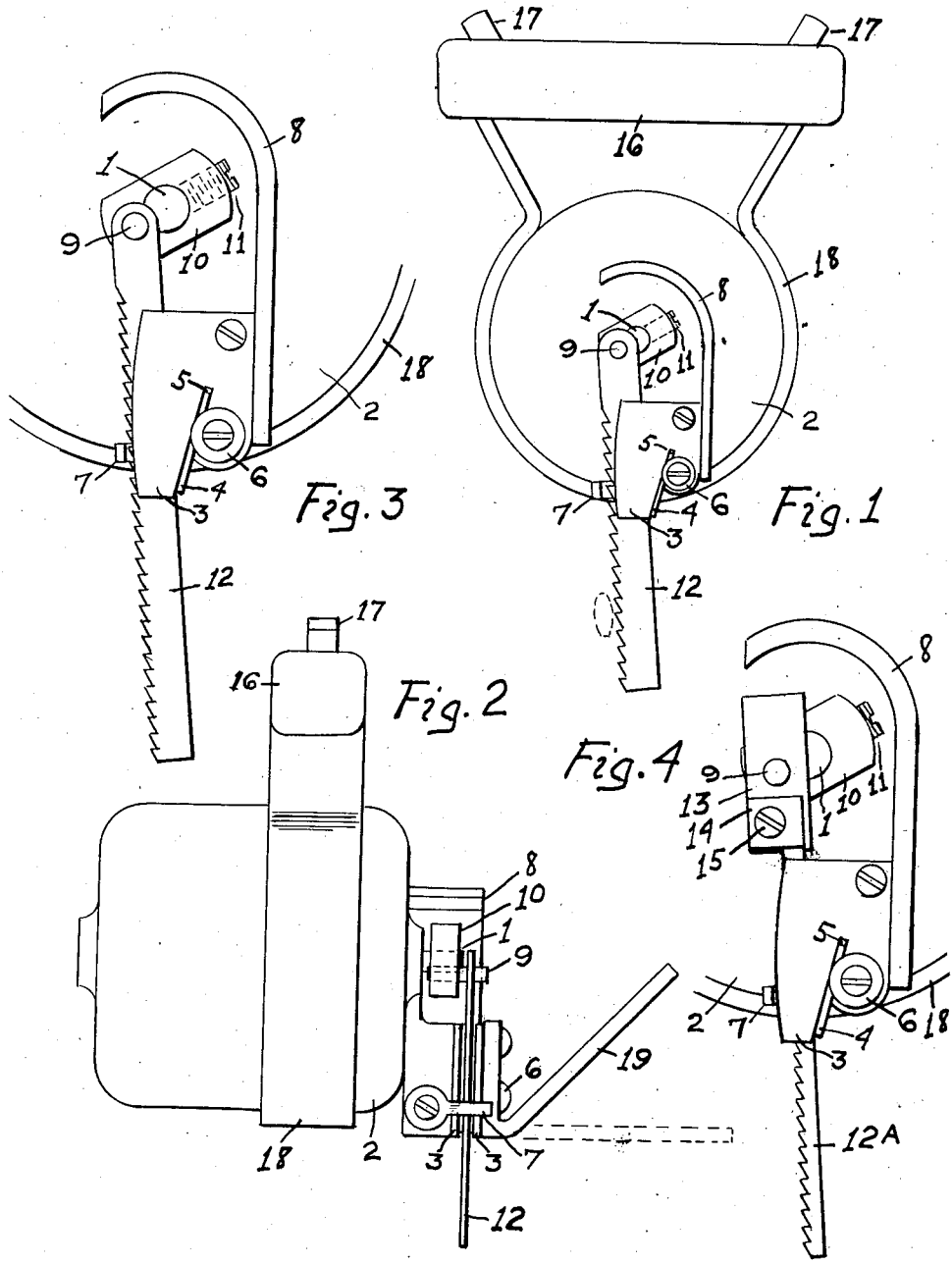
WITNESSES:
Edith Burger
INVENTOR.
Austin C. Elder

UNITED STATES PATENT OFFICE 2,137,893

POWER SAW

Austin C. Elder, Canton, Ohio

Application March 2, 1936, Serial No. 66,535

5 Claims. (Cl. 143—68)

The invention relates to electrically driven means for operating straight blade saws, and incorporates a novel oscillating movement of blade and is particularly adapted for portable use and for hand grip control.

An object of the improvement is to provide means for actuating a saw in more direct connection with a driving means, preferably consisting of an electric motor; to provide means for adapting a saw blade to have an oscillating movement in addition to reciprocating for effecting removal of sawdust while having a comparatively small movement and a rapid action corresponding with the driving shaft speed; to adapt the driving shaft to mount a crank-pin for directly connecting with the saw to be operated and to provide means for detachably holding the crank-pin to the shaft.

Another object is to adapt a frame preferably being that of the motor to mount the saw guides approximately radially to the mounted shaft thereof.

Another object is to provide means for readily placing and replacing wearing parts, including the crank-pin and saw guides.

Another intention is to provide means for adapting a saw blade so as to be pivotally mounted by the crank-pin.

A further intention is to provide means for controlling the device preferably including a handle carrying power controls, or work rests, or both.

The above and other objects may be attained by constructing the device in the manner illustrated in the accompanying drawing, in which Figure 1 is a side view;

Fig. 2, a front view;

Fig. 3, an enlarged detail view of saw mounting mechanism.

Fig. 4, a similar detail but showing a method of adapting a saw for pivoting to crank-pin.

Similar numerals refer to similar parts throughout the drawing.

The motor shaft 1 is supported by motor frame 2, which also mounts in a suitable manner saw guides 3 and 4.

The two side guide plates 3—3, which may be similar to each other, are spaced apart to receive a saw blade between them so as to furnish sideward support.

The back guide 4, which is preferably flexibly constructed or mounted, supports back of saw; it may be preferably mounted by keying the upper end in suitable slots 5, in side guide plates 3—3, and be fastened by clamping screw 6, the lower end of the guide 4 being thus unsupported and providing a flexible fulcrum for the back of the saw blade.

Another front guide 7 may be suitably mounted for guarding front edge of saw to prevent displacement when not in engagement with a piece of work.

The curved guard 8 is frame mounted by suitable means, for the purpose of partially protecting mechanism.

The motor shaft 1 is adapted to parallelly mount crank-pin 9, preferably by means of encompassing clamp 10 operated by set screw 11; the crank-pin is adapted to pivotally carry a saw blade 12 or 12A suitably adapted thereto, the blade substantially coinciding with a plane at right angles to crank axis.

When the motor shaft 1 is rotated as in operating, the saw 12 or 12A is caused to travel reciprocatively on the back guide 4 and to simultaneously pivot upon same, which causes the cutting point of a given tooth to travel in a generally elongated path, indicated in Fig. 1 adjacently along saw cutting edge by dotted line, which action of the saw teeth when sawing causes them to contact the work on the forward half of their stroke and to lift free off the work during the back half, thus acting to convey the sawdust longitudinally along the saw for removal from cut. The travel may be in either direction but preferably pulling while cutting, that is, cutting toward the frame generally.

In Fig. 4 is shown a pivotal member 13 for pivoting upon crank-pin 9 and adapted to rigidly fasten saw 12A by a suitable clamping means which may be represented by plate 14 and clamping screw 15.

It should be noted that crank-pin 9 and saw guides 3—3, 4 and 7, as well as saw blade represented by 12—12A, are subject to considerable wear and that provisions are made for readily placing and replacing these parts.

Obviously only a portion of frame 2 is essential for supporting saw mounting crank and guides, and is all that is required where other driving means is to be employed, such as a flexible shaft. However, the drawing shows a preferable form incorporating the motor.

The operating handle 16 preferably carrying dual power controls 17—17, may be mounted on frame 2, and may be adjustably fastened with the frame-surrounding band 18.

The planular work rest 19 in Fig. 2 shown attached is located adjacently, transversely and angularly at side of saw blade or position thereof. It is illustrated in one position, the dotted lines showing another position, it being obvious that any angularity may be constructed.

I claim:

1. A power driven saw including a rotary shaft, a saw blade, means connecting one end of the blade eccentric to the shaft, and guide means including a spaced pair of side guides located in planes at a right angle to the shaft and a back guide fixed at its upper end only to the side guides and having its lower free end bearing against the blade so as to guide the blade in a combined oscillating and reciprocating motion.

2. A power driven saw including a rotary shaft, a saw blade, means connecting one end of the blade eccentric to the shaft whereby said end of the blade travels in a circular path, and guide means including a spaced pair of side guides located in planes parallel to the blade, and a back guide bearing against the blade so as to guide the blade in a combined oscillating and reciprocating motion in an elliptical path.

3. A power driven tool including a rotary shaft, means for continuously rotating the shaft in one direction, a blade, means connecting one end of the blade eccentric to the shaft, and guide means including a spaced pair of side guides located in planes parallel to the blade, and a back guide fixed at its upper end only to the side guides and having its lower free end bearing against the blade so as to guide the blade in a combined oscillating and reciprocating motion consisting of a curved forward path and an oppositely curved rearward path.

4. A power driven tool including a rotary shaft, means for continuously rotating the shaft in one direction, a blade, means connecting one end of the blade eccentric to the shaft, and guide means including a spaced pair of side guides located in planes parallel to the blade, and a flexible back guide fixed at its upper end only to the side guides and having its lower free end bearing against the blade so as to guide the blade in a combined oscillating and reciprocating motion consisting of a curved forward path and an oppositely curved rearward path.

5. A power driven tool including a rotary shaft, means for continuously rotating the shaft in one direction, a blade, means directly connecting one end of the blade eccentric to the shaft, and guide means including a spaced pair of side guides located in planes parallel to the blade, and a flexible back guide end bearing against the back of the blade so as to guide the blade in a combined oscillating and reciprocating motion consisting of a curved forward path and an oppositely curved rearward path.

AUSTIN C. ELDER.

CERTIFICATE OF CORRECTION.

Patent No. 2,137,893.　　　　　　　　　　　　　　　November 22, 1938.

AUSTIN C. ELDER.

It is hereby certified that error appears in the printed specification of the above numbered patent requiring correction as follows: Page 2, second column, line 23, claim 5, strike out the word "end"; and that the said Letters Patent should be read with this correction therein that the same may conform to the record of the case in the Patent Office.

Signed and sealed this 10th day of January, A. D. 1939.

Henry Van Arsdale (Seal)　　　　　　　　　　　　　　　　　Acting Commissioner of Patents.